United States Patent
Oh et al.

(10) Patent No.: US 9,214,887 B2
(45) Date of Patent: Dec. 15, 2015

(54) APPARATUS AND METHOD FOR DRIVING VOICE COIL MOTOR

(71) Applicants: SAMSUNG ELECTRO-MECHANICS CO., LTD., Suwon (KR); ZINITIX CO., LTD, Yongin-si (KR)

(72) Inventors: Won Seob Oh, Suwon (KR); Je Hyun Park, Suwon (KR); Oh Byoung Kwon, Suwon (KR); Kyoung Won Hyun, Seongnam (KR); Jung Wook Hwang, Suwon (KR); Hoon Heo, Suwon (KR); Hong Soo Jung, Suwon (KR); Yong Joon Park, Suwon (KR)

(73) Assignees: Samsung Electro-Mechanics Co., Ltd., Suwon-si (KR); ZINITIX CO., LTD, Yongin-si (KR)

( * ) Notice: Subject to any disclaimer, the term of this patent is extended or adjusted under 35 U.S.C. 154(b) by 5 days.

(21) Appl. No.: 13/892,680

(22) Filed: May 13, 2013

(65) Prior Publication Data

US 2014/0009089 A1      Jan. 9, 2014

(30) Foreign Application Priority Data

Jul. 6, 2012   (KR) ........................ 10-2012-0074072
Jan. 31, 2013  (KR) ........................ 10-2013-0011309

(51) Int. Cl.
  *H02P 1/00*     (2006.01)
  *H02P 25/02*    (2006.01)
  *H02P 27/08*    (2006.01)

(52) U.S. Cl.
  CPC .............. *H02P 25/028* (2013.01); *H02P 27/08* (2013.01)

(58) Field of Classification Search
  CPC ......... H02P 25/028; H02P 27/08; H04R 9/02; G02B 7/08
  USPC .................. 318/135, 254.1, 500, 599, 34, 255
  See application file for complete search history.

(56) References Cited

U.S. PATENT DOCUMENTS

| | | | | |
|---|---|---|---|---|
| 5,319,294 | A | * | 6/1994 | Ohto et al. ............... 318/568.22 |
| 5,838,515 | A | * | 11/1998 | Mortazavi et al. ......... 360/78.12 |
| 6,377,015 | B1 | | 4/2002 | Nakabayashi et al. |
| 6,965,488 | B1 | * | 11/2005 | Bennett .......................... 360/75 |
| 7,224,135 | B1 | * | 5/2007 | Menegoli et al. ........ 318/400.26 |
| 7,477,471 | B1 | * | 1/2009 | Nemshick et al. .............. 360/75 |

(Continued)

FOREIGN PATENT DOCUMENTS

CN        1961353        5/2007
CN        101030385      9/2007

(Continued)

OTHER PUBLICATIONS

Japanese Office Action issued Apr. 15, 2014 in corresponding Japanese Patent Application No. 2013-081538.

(Continued)

*Primary Examiner* — David S Luo
(74) *Attorney, Agent, or Firm* — NSIP Law

(57) ABSTRACT

An apparatus and a method for driving a voice coil motor (VCM) may include an instruction signal generating unit generating an instruction signal according to a digital signal generated from an input signal, and a driving unit driving the VCM by selecting a path for a driving current applied to the VCM according to the digital signal and controlling a duty of the driving current according to the instruction signal.

13 Claims, 5 Drawing Sheets

(56) References Cited

U.S. PATENT DOCUMENTS

| | | | |
|---|---|---|---|
| 2002/0186491 A1 | 12/2002 | Hill | |
| 2003/0155896 A1* | 8/2003 | Ezio et al. | 323/280 |
| 2007/0133119 A1 | 6/2007 | Kim et al. | |
| 2007/0195451 A1* | 8/2007 | Kokami | 360/78.04 |
| 2009/0021610 A1 | 1/2009 | Lee et al. | |
| 2010/0182715 A1* | 7/2010 | Harmer | 360/75 |
| 2011/0102931 A1* | 5/2011 | Kuroiwa | 360/67 |

FOREIGN PATENT DOCUMENTS

| | | |
|---|---|---|
| JP | 4-150794 | 5/1992 |
| JP | 2001-67824 | 3/2001 |
| JP | 2003-79188 | 3/2003 |
| JP | 2008-503193 | 1/2008 |
| KR | 10-2006-0038703 | 5/2006 |
| KR | 10-2006-0080820 | 7/2006 |
| KR | 10-2009-0009481 | 1/2009 |
| WO | WO 2005/119658 | 12/2005 |

OTHER PUBLICATIONS

Office Action mailed May 28, 2015 for corresponding Chinese Patent Application No. 201310142161.X.

Korean Office Action mailed Feb. 28, 2014 in corresponding Korean Application No. 10-2013-0011309.

* cited by examiner

APPARATUS AND METHOD FOR DRIVING VOICE COIL MOTOR

CROSS-REFERENCE TO RELATED APPLICATIONS

This application claims the priorities of Korean Patent Application No. 10-2012-0074072 filed on Jul. 6, 2012, and Korean Patent Application No. 10-2013-0011309 filed on Jan. 31, 2013, in the Korean Intellectual Property Office, the disclosure of which is incorporated herein by reference.

BACKGROUND OF THE INVENTION

1. Field of the Invention

The present invention relates to an apparatus and a method for driving a voice coil motor (VCM), and more particularly, to an apparatus and a method for driving a VCM used for various purposes, such as lens position control, or the like, in a camera having an automatic focus control function.

2. Description of the Related Art

As the use of portable wireless terminals has markedly increased in recent times, portable wireless terminals have had various functions added thereto, in addition to their original voice communications function. A camera module, one of various features added to portable wireless terminals, carries out automatic focusing by allowing a voice coil motor (VCM), provided in portable wireless terminals, to move a lens.

The voice coil motor (VCM) is developed by considering the fact that a speaker is vibrated back and forth by force generated according to Fleming's left hand rule between voice current flowing in a voice coil of the speaker and magnetic force generated by a permanent magnet. A DC motor or a stepping motor has rotary motion, whereas the voice coil motor (VCM) has linear reciprocating motion over a short distance and therefore may be used for automatic focus control.

Generally, in the case of portable wireless terminals that are required to be miniaturized, since a driving power supply does not supply negative (−) voltage, a method of allowing one side of a movement range of a lens to be set as an initial position and then applying DC current to a voice coil motor (VCM) to move the lens from the initial position may be used in the voice coil motor (VCM).

However, the foregoing method has limitations in that the distance of movement is increased, and thus a large amount of voltage is required in order to move the lens from the initial position to a set maximal magnification, and current consumption is thereby increased.

RELATED ART DOCUMENT (Patent Document 1) Korean Patent Laid-Open Publication No. 10-2006-0080820 (Jul. 11, 2006)

SUMMARY OF THE INVENTION

An aspect of the present invention provides an apparatus and a method for driving a voice coil motor (VCM), capable of increasing a distance of movement of the voice coil motor (VCM) to a distance equal to twice that of the related art with the same amount of current, by driving the direction of current applied to the voice coil motor (VCM) in two ways and reducing power consumption by controlling the amount of current applied to the voice coil motor (VCM) in a pulse width modulation (PWM) scheme.

According to an aspect of the present invention, there is provided an apparatus for driving a voice coil motor (VCM), the apparatus including: an instruction signal generating unit generating an instruction signal according to a digital signal generated from an input signal; and a driving unit driving the voice coil motor (VCM) by selecting a path for a driving current applied to the voice coil motor (VCM) according to the digital signal and controlling a duty of the driving current according to the instruction signal.

The instruction signal generating unit may include: a digital signal generating unit generating the digital signal from the input signal; and a signal converting unit converting the digital signal into the instruction signal.

The driving unit may include: a comparing unit comparing the instruction signal with a feedback signal; a switching unit including a plurality of switches having at least one terminal connected to the voice coil motor (VCM); a controlling unit determining the path for the driving current and the duty of the driving current based on the digital signal and comparison results of the comparing unit to control the switching unit; and a feedback circuit unit detecting the driving current to generate the feedback signal.

The switching unit may include: a first switch connecting one terminal of the voice coil motor (VCM) to a driving power supply; a second switch connecting the other terminal of the voice coil motor (VCM) to the driving power supply; a third switch connecting one terminal of the voice coil motor (VCM) to the feedback circuit unit; and a fourth switch connecting the other terminal of the voice coil motor (VCM) to the feedback circuit unit.

The path for the driving current may include a first path and a second path, and the first switch and the fourth switch may be located on the second path while the second switch and the third switch may be located on the first path.

The voice coil motor (VCM) may be provided with voltages having different polarities due to the driving current applied along the first and second paths.

The controlling unit may compare the digital signal with a predetermined digital value to select one of the first path and the second path, and may control two switches located on the selected path to be switched on and control a switching duty of at least one of the two switches switched on based on the comparison results of the comparing unit.

The feedback circuit unit may include: at least one resistor element detecting the driving current.

According to another aspect of the present invention, there is provided a method for driving a voice coil motor (VCM), the method including: generating an instruction signal according to a digital signal generated from an input signal; and driving the voice coil motor (VCM) by selecting a path for a driving current applied to the voice coil motor (VCM) according to the digital signal and controlling a duty of the driving current according to the instruction signal.

The generating of the instruction signal may include: generating the digital signal from the input signal; and converting the digital signal into the instruction signal.

The driving of the voice coil motor (VCM) may include: comparing the instruction signal with a feedback signal generated by detecting the driving current; selecting the path for the driving current according to the digital signal; controlling the duty of the driving current based on comparison results of the instruction signal and the feedback signal; and applying the driving current to the voice coil motor (VCM) according to the selected path for the driving current and the controlled duty of the driving current.

The driving of the voice coil motor may further include: detecting the driving current and generating the feedback signal.

The path for the driving current may include a first path and a second path, and the voice coil motor (VCM) may be provided with voltages having different polarities due to the driving current applied along the first path and the second path.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
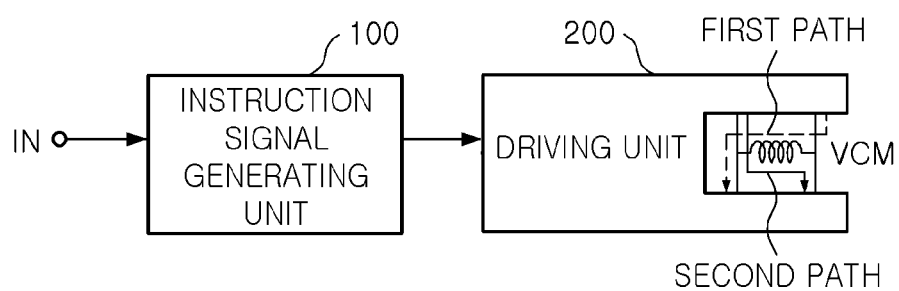
FIG. 1 is a block diagram schematically illustrating an apparatus for driving a voice coil motor (VCM) according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a block diagram schematically illustrating an apparatus for driving a voice coil motor (VCM) according to an embodiment of the present invention. Referring to FIG. 1, the apparatus for driving a voice coil motor (VCM) according to the embodiment of the present invention may include an instruction signal generating unit 100 and a driving unit 200.

The instruction signal generating unit 100 may generate an instruction signal according to a digital signal generated from a signal introduced to an input terminal IN. The input signal may refer to a signal applied from the outside generated by user input. The instruction signal generated according to the input signal may have a current level, and the driving unit 200 may generate a driving current according to the current level indicated by the instruction signal to operate the voice coil motor (VCM).

The driving unit 200 may select a path for the driving current applied to the voice coil motor (VCM) according to the digital signal and the instruction signal, and may control a duty of the driving current to thereby control the voice coil motor (VCM). In detail, the driving unit 200 may select the path for the driving current applied to the voice coil motor (VCM) according to the digital signal and determine the duty of the driving current according to the instruction signal to thereby control the voice coil motor (VCM).

As illustrated in FIG. 1, the driving current may be applied to the voice coil motor (VCM) along two paths, a first path and a second path, and the voice coil motor (VCM) may have voltages having different polarities applied thereto according to the two paths of the driving current.

Figure 2:
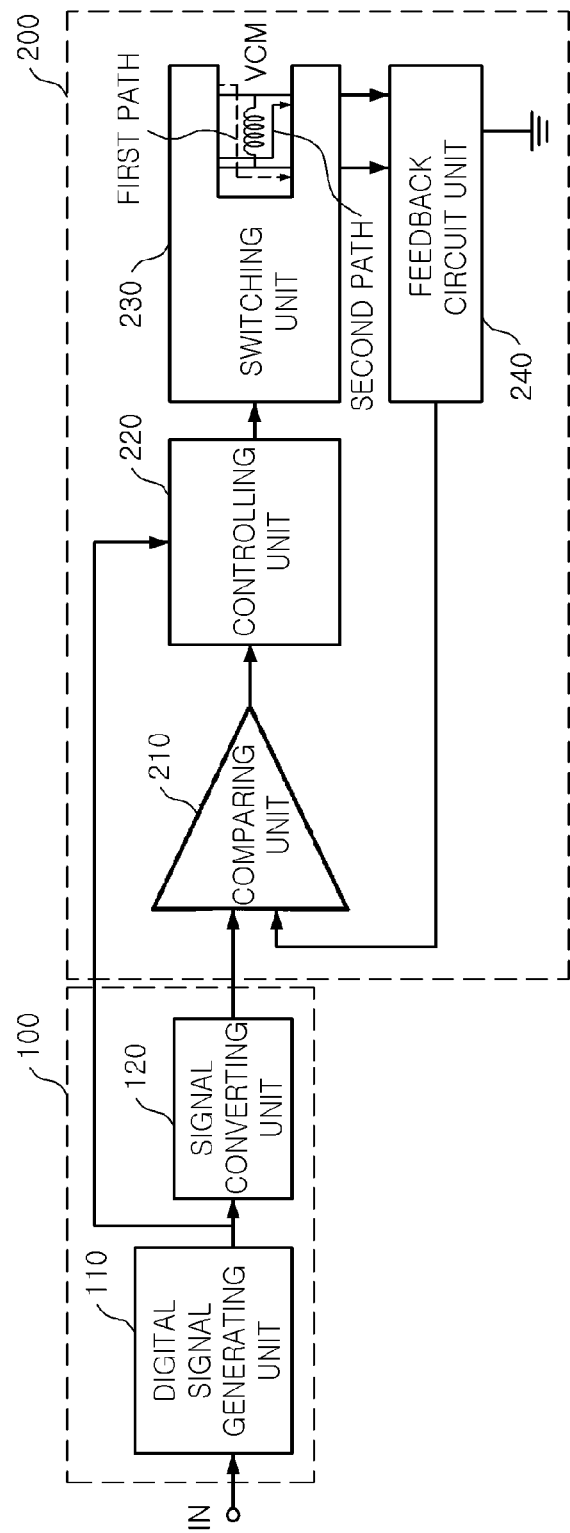
FIG. 2 is a block diagram illustrating the apparatus for driving a voice coil motor (VCM) according to the embodiment of the present invention in detail.

FIG. 2 is a block diagram illustrating the apparatus for driving a voice coil motor (VCM) according to the embodiment of the present invention in detail. Referring to FIG. 2, the instruction signal generating unit 100 illustrated in FIG. 1 may include a digital signal generating unit 110 and a signal converting unit 120.

The digital signal generating unit 110 may generate the digital signal from the input signal applied from the outside by user input, and the signal converting unit 120 may convert the digital signal generated by the digital signal generating unit 110 to generate the instruction signal.

Hereinafter, the case in which, for example, a 10-bit digital signal is generated by the digital signal generating unit 110 will be described in the embodiment of the present invention. However, the embodiment of the present invention is merely provided by way of example, and the present invention is not limited to the case of generating a 10-bit digital signal.

The digital signal generating unit 110 may generate a 10-bit digital signal having values of 0 to 1023 from the input signal. The signal converting unit 120 may convert the 10-bit digital signal having values of 0 to 1023 generated by the digital signal generating unit 110 to generate the instruction signal.

Figure 3:
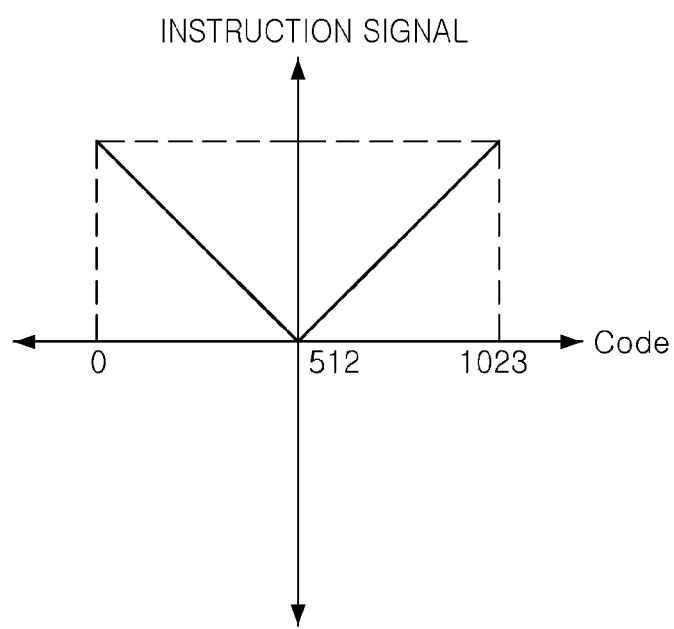
FIG. 3 is a graph illustrating an instruction signal generated by a signal converting unit according to the embodiment of the present invention.

FIG. 3 is a graph illustrating an instruction signal generated by a signal converting unit according to the embodiment of the present invention. In detail, FIG. 3 is a graph illustrating the instruction signal generated by converting the 10-bit digital signal, in the case in which the digital signal generating unit 110 according to the embodiment of the present invention generates the 10-bit digital signal from the input signal. However, the embodiment of the present invention is merely provided by way of example and is not limited to the case of generating the 10-bit digital signal according to the embodiment of the present invention as described above.

The signal converting unit 120 may convert the digital signal generated by the digital signal generating unit 110 to generate the instruction signal having a magnitude that is linearly increased and decreased based on a first digital value. In this case, the instruction signal may have the current level, and the driving unit 200 may generate the driving current according to the current level of the instruction signal to drive the voice coil motor (VCM).

Referring to FIG. 3, when a value of the 10-bit digital signal generated by the digital signal generating unit 110 is 0, the signal converting unit 120 may convert the digital signal to generate an instruction signal having a maximum magnitude. As the value of the 10-bit digital signal is increased, the magnitude of the instruction signal is linearly decreased, such that the signal converting unit 120 may generate an instruction signal having a magnitude of 0 when a value of the 10-bit digital signal is 512. Next, as the value of the 10-bit digital signal is increased from 512 to 1023, the magnitude of the instruction signal is continuously increased linearly, such that the signal converting unit 120 may generate the instruction signal having a maximum magnitude when the 10-bit digital signal has a value of 1023.

In FIG. 3, it can be appreciated that in the case in which the value of the 10-bit digital signal is 0 and in the case in which the value of the 10-bit digital signal is 1023, the magnitudes of the instruction signals generated by the signal converting unit 120 are identical to each other. That is, a first quadrant and a second quadrant of the graph have y-axial symmetry with regard to each other, and it can be appreciated that the second quadrant has a negative slope while the first quadrant is a positive slope, and therefore, the first and second quadrants may have slopes of different signs but the same magnitude.

The foregoing embodiment discloses that as the value of the digital signal is increased and decreased based on an intermediate value, the magnitude of the instruction signal is linearly increased while having the same slope, under the assumption that the first digital value is 512, the intermediate value of the 10-bit digital signal. However, unlike this, a first digital value that does not correspond to the intermediate value may be set as a reference value, and further, as the value of the digital signal is increased and decreased based on an optional first digital value, the magnitude of the instruction signal may be set to be linearly increased while having different slopes.

Referring back to FIG. 2, the driving unit 200 may include a comparing unit 210, a controlling unit 220, a switching unit 230, and a feedback circuit unit 240.

The comparing unit 210 may compare the instruction signal generated by the signal converting unit 120 with a feedback signal generated by, and transferred from, the feedback circuit unit 240 to output the comparison results. In this case, as described below, the feedback signal may include a voltage level and therefore, the comparing unit 210 may include a conversion circuit for allowing mutual alternation between current and voltage in order to compare the instruction signal with the feedback signal, or the like.

The controlling unit 220 may determine the path for the driving current and the duty of the driving current according to the digital signal and the comparison results of the comparing unit 210 to thereby control the switching unit 230.

The controlling unit 220 compares the digital signal generated by the digital signal generating unit 110 with a predetermined second digital value and selects the path for the driving current to vary the direction of the driving current applied to the voice coil motor (VCM), thereby driving the voice coil motor (VCM) in two ways. In this case, the first digital value and the second digital value may be set to have the same value. For example, when the 10-bit digital signal is generated by the digital signal generating unit 110, the first digital value and the second digital value may be set to be identical to an optional value of the 10-bit digital signal and may also be set to be the intermediate value of the 10-bit digital signal.

The comparing unit 210 compares the instruction signal with the feedback signal to output the comparison results such as an error of the instruction signal and the feedback signal, and the like and the controlling unit 220 may control the duty of the driving current based on the comparison results of the comparing unit.

The switching unit 230 may include a plurality of switches having at least one terminal connected to the voice coil motor (VCM), and may be switched by a control of the controlling unit 220 to form a current path between the driving power supply and the voice coil motor (VCM), thereby driving the voice coil motor (VCM).

The feedback circuit unit 240 may detect the driving current applied to the voice coil motor (VCM) to generate the feedback signal and transfer the generated feedback signal to the comparing unit 210.

Figure 4:
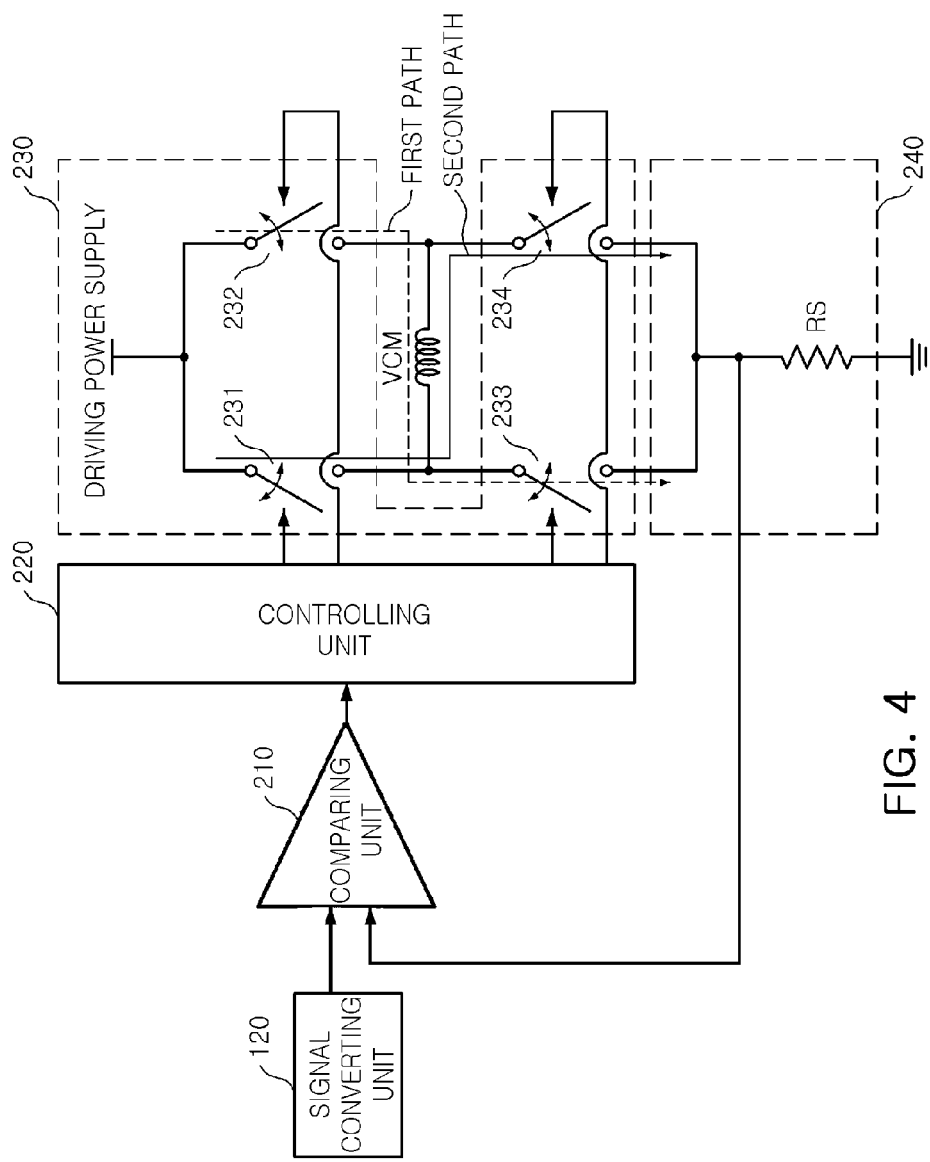
FIG. 4 is a diagram illustrating a driving unit according to the embodiment of the present invention in detail.

FIG. 4 is a diagram illustrating a driving unit according to the embodiment of the present invention in detail. A circuit configuration of the switching unit 230 and the feedback circuit unit 240 will be described in more detail with reference to FIG. 4.

The switching unit 230 may include first to fourth switches 231 to 234. The first switch 231 may connect the driving power supply to one terminal of the voice coil motor (VCM), the second switch 232 may connect the driving power supply to the other terminal of the voice coil motor (VCM), the third switch 233 may connect the one terminal of the voice coil motor (VCM) to the feedback circuit unit 240, and the fourth switch 234 may connect the other terminal of the voice coil motor (VCM) to the feedback circuit unit 240.

The first to fourth switches 231 to 234 may respectively include N-channel and P-channel field effect transistors. In addition, the first to fourth switches 231 to 234 may also be configured by a combination of the N-channel and P-channel field effect transistors. For example, the first and third switches 231 and 233 may respectively include the P-channel field effect transistor, and the second and fourth switches 232 and 234 may respectively include the N-channel field effect transistor. However, the present invention is not limited thereto, and therefore matters that can be clearly derived by those skilled in the art by altering a design, including a BJT element, may belong to the technical matters of the present invention.

The path for the driving current may include the first path and the second path. The first path for the driving current may be formed through the second switch 232, the voice coil motor (VCM), and the third switch (233) (the second switch 232-the voice coil motor (VCM)-the third switch (233)), and the second path for the driving current may be formed through the first switch 231, the voice coil motor (VCM), and the fourth switch 234 (the first switch 231-the voice coil motor (VCM)-the fourth switch 234).

The controlling unit 220 may compare the digital signal with the second digital value to select one of the first path and the second path, and control two switches located on the selected path to be switched on and control the switching duty of at least one of the two switches located on the selected path based on the comparison results of the comparing unit 210.

Next, the present invention will be described, by way of example, under the assumption that the controlling unit 220 selects the first path when the value of the digital signal is less than the second digital value and selects the second path when the value of the digital signal is equal to or greater than the second digital value.

When the digital signal is less than the second digital value, the first path is selected, such that the controlling unit 220 may control the second switch 232 and the third switch 233 to be switched on and control a switching-on duty of at least one of the switches located on the first path. In this case, all the switches located on the second path may be switched off, but may be controlled in other manners. For example, when the switching-on duty of the third switch 233 is controlled to control the duty of the driving current, the controlling unit 220 may control the first switch 231 and the fourth switch 234 located on the second path to be switched off, or may control the first switch 231 to be switched with a phase difference of 180 degrees with respect to the third switch 233 and control the fourth switch 234 to be switched off.

Further, unlike this, when the level of the digital signal is equal to or greater than the second digital value, the second path is selected, such that the controlling unit 220 may control the first switch 231 and the fourth switch 234 to be switched on and control a switching-on duty of at least one of the switches located on the second path. In this case, all the switches located on the first path may be switched off, but may be control in other manners. For example, when the switching-on duty of the fourth switch 234 is controlled to control the duty of the driving current, the controlling unit 220 may control the second switch 232 and the third switch 233 located on the first path to be switched off or may control the second switch 232 to be switched with a phase difference of 180 degrees with respect to the fourth switch 234 and control the third switch 233 to be switched off.

The feedback circuit unit 240 may include at least one resistor element RS detecting the driving current and generating the feedback signal. FIG. 4 illustrates one resistor element RS connected to the third switch 233 and the fourth switch 234, but which is merely provided by way of example. Therefore, the present invention may include all embodiments that may be included by altering a design by those skilled in the art. For example, the feedback circuit unit 240 may include one resistor element that connects the third switch to a ground and another resistor element that connects the fourth switch to the ground.

The feedback circuit unit 240 may detect the driving current as a voltage level through the resistor element RS and transfer the detected driving current to the comparing unit 210 as the feedback signal.

Figure 5:
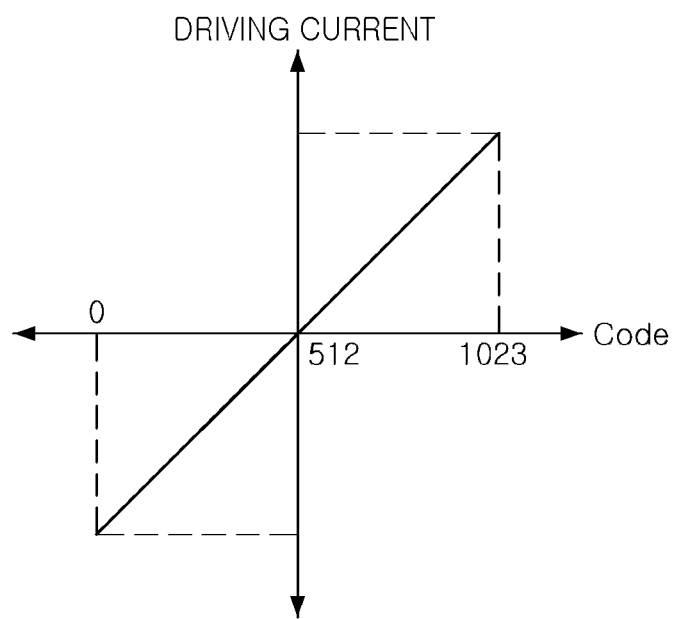
FIG. 5 is a graph illustrating a driving current applied to the voice coil motor (VCM) according to the embodiment of the present invention.

FIG. 5 is a graph illustrating a driving current applied to the voice coil motor (VCM) according to the embodiment of the present invention. In FIG. 5, in the case in which the foregoing second digital value is identical to the intermediate value of the 10-bit digital signal, for convenience of explanation, when the first path is selected, the driving current is represented by a negative (−) current, while when the second path is selected, the driving current is represented by a positive (+) current.

Referring to FIGS. 3 and 5, it can be appreciated that the direction of the driving current applied to the voice coil motor (VCM) may be varied along the path for the driving current formed according to the digital signal.

As set forth above, according to the embodiment of the present invention, the distance of movement of the voice coil motor (VCM) can be increased to a distance equal to twice that of the related art with the same amount of current, by driving the direction of current applied to the voice coil motor (VCM) in two ways. Further, power consumption can be reduced by controlling the amount of current applied to the voice coil motor (VCM) in the pulse width modulation (PWM) scheme.

While the present invention has been shown and described in connection with the embodiments, it will be apparent to those skilled in the art that modifications and variations can be made without departing from the spirit and scope of the invention as defined by the appended claims.

What is claimed is:

1. An apparatus for driving a voice coil motor (VCM), the apparatus comprising:
   an instruction signal generating unit generating an instruction signal according to a digital signal generated from an input signal; and
   a driving unit driving the VCM by selecting a path for a driving current applied to the VCM according to a value of the digital signal and controlling a duty of the driving current according to a current level of the instruction signal,
   the instruction signal having a maximum current level at a minimum digital level and a maximum digital level of the digital signal, and the instruction signal having minimum current level at a first digital level of the digital signal, and the instruction signal decreasing linearly, as the digital level is increased from the minimum digital level to the first digital level, and the instruction signal increasing linearly, as the digital level is increased from the first digital level to the maximum digital level.

2. The apparatus of claim 1, wherein the instruction signal generating unit includes:
   a digital signal generating unit generating the digital signal from the input signal; and
   a signal converting unit converting the digital signal into the instruction signal.

3. The apparatus of claim 1, wherein the driving unit includes:
   a comparing unit comparing the instruction signal with a feedback signal;
   a switching unit including a plurality of switches having at least one terminal connected to the VCM;
   a controlling unit determining the path for the driving current and the duty of the driving current based on the digital signal and comparison results of the comparing unit to control the switching unit; and
   a feedback circuit unit detecting the driving current to generate the feedback signal.

4. The apparatus of claim 3, wherein the switching unit includes:
   a first switch connecting one terminal of the VCM to a driving power supply;
   a second switch connecting the other terminal of the VCM to the driving power supply;
   a third switch connecting one terminal of the VCM to the feedback circuit unit; and
   a fourth switch connecting the other terminal of the VCM to the feedback circuit unit.

5. The apparatus of claim 4,
   wherein the path for the driving current includes a first path and a second path, and
   wherein the first switch and the fourth switch are located on the second path while the second switch and the third switch are located on the first path.

6. The apparatus of claim 5, wherein the VCM is provided with voltages having different polarities due to the driving current applied along the first and second paths.

7. The apparatus of claim 6, wherein the controlling unit compares the digital signal with a second digital value to select one of the first path and the second path, and controls two switches located on the selected path to be switched on and controls a switching duty of at least one of the two switches switched on based on the comparison results of the comparing unit.

8. The apparatus of claim 7, wherein the feedback circuit unit includes at least one resistor element detecting the driving current.

9. A method for driving a voice coil motor (VCM), comprising:
   generating an instruction signal according to a digital signal generated from an input signal; and
   driving the VCM by selecting a path for a driving current applied to the VCM according to a value of the digital signal and controlling a duty of the driving current according to a current level of the instruction signal,
   the generating of the instruction signal generating the instruction signal having a maximum current level at a minimum digital level and a maximum digital level of the digital signal, and the instruction signal having minimum current level at a first digital level of the digital signal, and the instruction signal decreasing linearly, as the digital level is increased from the minimum digital level to the first digital level, and the instruction signal increasing linearly, as the digital level is increased from the first digital level to the maximum digital level.

10. The method of claim 9, wherein the generating of the instruction signal includes:
generating the digital signal from the input signal; and
converting the digital signal into the instruction signal.

11. The method of claim 10, wherein the driving of the VCM includes:
comparing the instruction signal with a feedback signal generated by detecting the driving current;
selecting the path for the driving current according to the digital signal;
controlling the duty of the driving current based on comparison results of the instruction signal and the feedback signal; and
applying the driving current to the VCM according to the selected path for the driving current and the controlled duty of the driving current.

12. The method of claim 11, wherein the driving of the VCM further includes detecting the driving current and generating the feedback signal.

13. The method of claim 11, wherein the path for the driving current includes a first path and a second path, and the VCM is provided with voltages having different polarities due to the driving current applied along the first path and the second path.

* * * * *